(12) United States Patent
Sah

(10) Patent No.: US 8,550,958 B2
(45) Date of Patent: Oct. 8, 2013

(54) SHIFT CONTROL METHOD FOR A MULTI-MODE HYBRID TRANSMISSION

(75) Inventor: Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1095 days.

(21) Appl. No.: 12/414,757

(22) Filed: Mar. 31, 2009

(65) Prior Publication Data

US 2010/0248892 A1 Sep. 30, 2010

(51) Int. Cl.
*B60W 10/02* (2006.01)

(52) U.S. Cl.
USPC .......................................... 477/5; 180/65.275

(58) Field of Classification Search
USPC .............................. 180/65.21, 65.275; 477/3, 5
See application file for complete search history.

(56) References Cited

U.S. PATENT DOCUMENTS

| | | | |
|---|---|---|---|
| 6,383,114 B1 * | 5/2002 | Hoshiya et al. | ............... 477/2 |
| 6,656,087 B1 * | 12/2003 | Runde et al. | ............... 477/107 |
| 7,010,406 B2 | 3/2006 | Sah et al. | |
| 7,130,734 B2 | 10/2006 | Sah et al. | |
| 7,217,211 B2 | 5/2007 | Klemen et al. | |
| 7,220,203 B2 * | 5/2007 | Holmes et al. | ............... 475/5 |
| 7,324,885 B2 | 1/2008 | Sah et al. | |
| 7,356,398 B2 | 4/2008 | Steinmetz et al. | |
| 2006/0289212 A1 * | 12/2006 | Haruhisa | ............... 180/65.2 |
| 2007/0275808 A1 * | 11/2007 | Iwanaka et al. | ............... 475/5 |
| 2007/0276569 A1 | 11/2007 | Sah et al. | |
| 2008/0234097 A1 | 9/2008 | Sah | |

* cited by examiner

*Primary Examiner* — Hau Phan
*Assistant Examiner* — Bryan Evans
(74) *Attorney, Agent, or Firm* — Quinn Law Group, PLLC

(57) ABSTRACT

A method for regulating operation of a hybrid transmission selectively connectable to an engine includes deactivating an offgoing clutch to place the transmission in a first EVT mode. The transmission is then placed in an ETC mode and an oncoming clutch is actuated to place the transmission in a second EVT mode. An engine-on state is maintained during deactivation of the offgoing clutch and actuation of the oncoming clutch. Transitioning from the first to second EVT mode may be characterized by lack of a transition through a fixed-gear mode. The transmission may be configured to continuously produce output torque during the transition from the first to second EVT mode. The oncoming clutch may be synchronized to zero clutch slip prior to actuating the oncoming clutch. Engine speed may be varied while the offgoing clutch is disengaged and prior to actuating the oncoming clutch.

9 Claims, 2 Drawing Sheets

| Transmission State | C4 | C3 | C2 | C1 |
|---|---|---|---|---|
| Neutral1 | Off | Off | Off | Off |
| ETC1 | Off | Off | Off | ON |
| ETC2 | Off | Off | ON | Off |
| ETC12 | Off | Off | ON | ON |
| Neutral2 | Off | ON | Off | Off |
| EVT1 | Off | ON | Off | ON |
| EVT4 | Off | ON | ON | Off |
| Park | Off | ON | ON | ON |
| Neutral3 | ON | Off | Off | Off |
| EVT2 | ON | Off | Off | ON |
| EVT3 | ON | Off | ON | Off |
| FG2 | ON | Off | ON | ON |
| Neutral4 | ON | ON | Off | Off |
| FG1 | ON | ON | Off | ON |
| FG3 | ON | ON | ON | Off |

SHIFT CONTROL METHOD FOR A MULTI-MODE HYBRID TRANSMISSION

TECHNICAL FIELD

The present invention relates generally to hybrid powertrains for motorized vehicles, and hydraulic control thereof.

BACKGROUND OF THE INVENTION

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE) because of its ready availability, relatively-inexpensive cost, light weight, and relative efficiency. Such engines include four-stroke compression-ignited diesel engines and four-stroke spark-ignited gasoline engines.

Hybrid vehicles utilize alternative power sources to propel the vehicle, minimizing reliance on the engine for power, and increasing overall fuel economy. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles may be turned off while the vehicle is stopped or is being propelled by the alternative power source(s).

Series hybrid architectures, sometimes referred to as Range-Extended Electric Vehicles (REEVs), are generally characterized by an internal combustion engine in driving communication with an electric generator. The electric generator provides power to one or more electric motors operable to rotate the final drive members. There may be no direct mechanical connection between the engine and the drive members in a series hybrid powertrain. The lack of a mechanical link between the engine and wheels allows the engine to run at a constant and efficient rate, even as vehicle speed changes. The electric generator may also operate to start the internal combustion engine. The system may also allow the electric motor(s) to recover energy by slowing the vehicle and storing it in the battery through regenerative braking.

Parallel hybrid architectures are generally characterized by an internal combustion engine and one or more electric motor/generator assemblies, all of which have a direct mechanical coupling to the transmission. Parallel hybrid designs utilize combined electric motor/generators, which provide traction and may replace both the conventional starter motor and alternator. The motor/generators are electrically connected to an energy storage device (ESD). The energy storage device may be a chemical battery. A control unit is employed for regulating the electrical power interchange between the energy storage device and motor/generators, as well as the electrical power interchange between the first and second motor/generators.

Electrically-variable transmissions (EVT) provide for continuously variable speed ratios by combining features from both series and parallel hybrid powertrain architectures, and also elements of traditional, non-hybrid transmissions. EVTs may be designed to operate in both fixed-gear (FG) modes and EVT modes. When operating in a fixed-gear mode, the rotational speed of the transmission output member is a fixed ratio of the rotational speed of the input member from the engine, depending upon the selected arrangement of the differential gearing subsets. EVTs are also configured for engine operation that is mechanically independent from the final drive, thereby enabling high-torque continuously-variable speed ratios, electrically dominated launches, regenerative braking, engine-off idling, and two-mode operation.

An EVT may combine the motor/generators with differential gearing to achieve continuously variable torque and speed ratios between the input and output. The EVT can utilize the differential gearing to send a fraction of its transmitted power through the electric motor/generator(s) and the remainder of its power through another, parallel path that is mechanical. One form of differential gearing used is the epicyclic planetary gear arrangement. However, it is possible to design a power split transmission without planetary gears, for example, as by using bevel gears or other differential gearing.

Hydraulically-actuated torque-transmitting mechanisms, such as clutches and brakes, are selectively engageable to selectively activate the gear elements for establishing different forward and reverse speed ratios and modes between the transmission input and output shafts. The term "clutch" is used hereinafter to refer to both clutches and brakes. Shifting from one speed ratio or mode to another may be in response to vehicle conditions and operator (driver) demands. The "speed ratio" is generally defined as the transmission input speed divided by the transmission output speed. Thus, a low gear range has a high speed ratio, and a high gear range has a relatively lower speed ratio. Because EVTs are not limited to single-speed gear ratios, the different operating states may be referred to as ranges or modes.

The range or mode change may be controlled through a multi-clutch synchronization and release process. A first clutch associated with a currently-active range is carrying torque in an applied state, while a second clutch associated with a currently-inactive second range is carrying no torque in a released state. Shifting from a first range to a second range is accomplished by controlling the second, unapplied clutch to zero slip speed, and applying the second clutch (the oncoming clutch) thereby placing the EVT in a state with both clutches applied. The second range is then entered by the release of the first clutch (the offgoing clutch).

SUMMARY OF THE DISCLOSURE

A method for regulating operation of a multi-mode hybrid transmission is provided. The transmission is selectively drivingly connectable to an engine. The method or algorithm includes deactivating an offgoing clutch operable to place the transmission in a first electrically-variable transmission (EVT) mode. The transmission is then placed in an electric torque converter (ETC) mode, and an oncoming clutch operable to place the transmission in a second EVT mode is actuated. The engine maintains an engine-on state during deactivation of the offgoing clutch and actuation of the oncoming clutch.

Transitioning from the first EVT mode to the second EVT mode may be characterized by lack of a transition through a fixed-gear (FG) or direct-drive mode. The transmission may be configured to continuously produce output torque during the transition from the first to the second EVT mode.

The method may include synchronizing the oncoming clutch to substantially zero clutch slip speed. This synchronization occurs prior to actuating the oncoming clutch. Deactivating the offgoing clutch may include exhausting the offgoing clutch to a predetermined fill level prior to actuating the oncoming clutch, and then releasing the offgoing clutch after actuating the oncoming clutch.

The method may further include determining if an EVT-to-EVT mode shift sequence is commanded and filling the oncoming clutch to a predetermined pre-fill level if an EVT-to-EVT mode shift sequence is commanded. Engine speed may be varied while the offgoing clutch is disengaged and prior to actuating the oncoming clutch. The oncoming clutch and the offgoing clutch may both be holding clutches.

The above features and advantages, and other features and advantages of the present invention will be readily apparent from the following detailed description of the preferred embodiments and other modes for carrying out the present invention when taken in connection with the accompanying drawings and appended claims.

DESCRIPTION OF PREFERRED EMBODIMENTS

Figure 1:
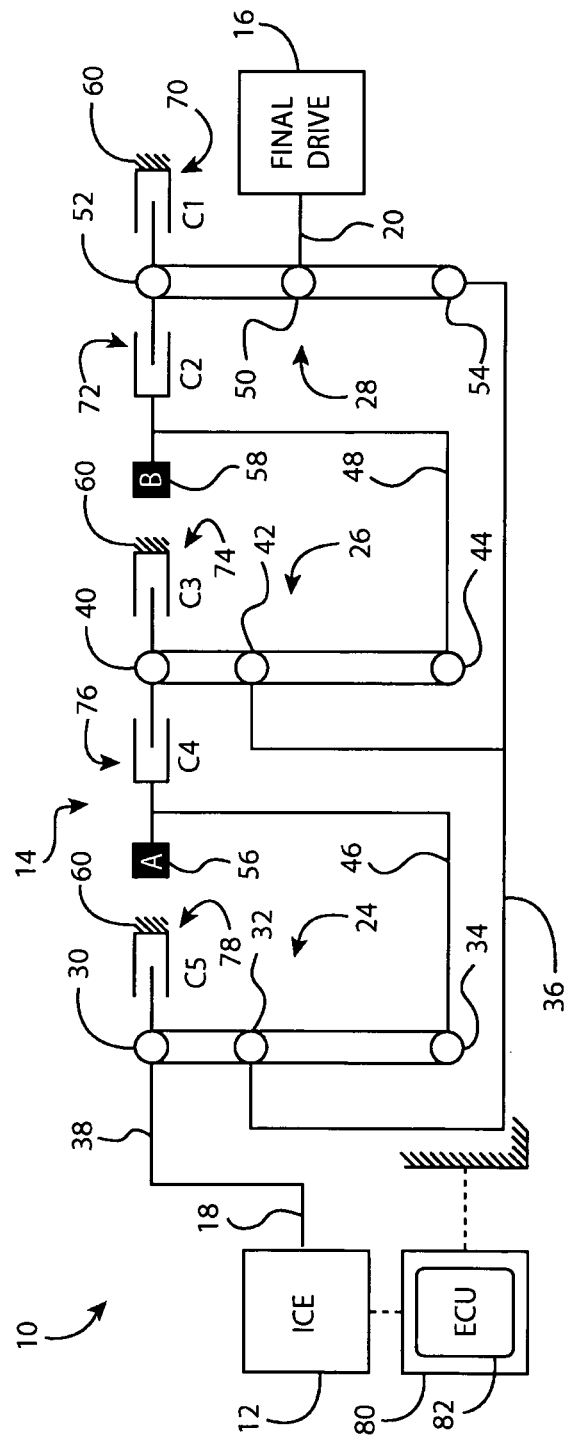
FIG. 1 is a schematic lever diagram illustration of an exemplary vehicle powertrain with a multi-mode, electrically-variable hybrid transmission in accordance with the present invention.

The claimed invention is described herein in the context of a hybrid-type vehicular powertrain having a multi-mode, multi-speed, electrically-variable, hybrid transmission, which is intended solely to offer a representative application by which the claimed invention may be incorporated and practiced. The claimed invention is not limited to the particular powertrain arrangement shown in the drawings. Furthermore, the hybrid powertrain illustrated herein has been greatly simplified, it being understood that further information regarding the standard operation of a hybrid powertrain, or a hybrid-type vehicle will be recognized by those having ordinary skill in the art.

Referring to the drawings, wherein like reference numbers refer to like components throughout the several views, there is shown in FIG. 1 a lever diagram depiction of an exemplary vehicle powertrain system, designated generally as 10. The powertrain 10 includes a restartable engine 12 that is selectively drivingly connected to, or in power flow communication with, a final drive system 16 via a multi-mode, electrically-variable hybrid-type power transmission 14.

A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets and other components of the transmission (such as motor/generators) are illustrated by thin, horizontal lines. Torque transmitting devices such as clutches and brakes are presented as interleaved fingers. If the device is a brake, one set of the fingers is grounded.

The transmission 14 is designed to receive at least a portion of its driving power from the engine 12, through an input member 18, for example. The transmission input member 18, which is in the nature of a shaft, may be the engine output shaft (also referred to as a "crankshaft"). Alternatively, a transient torque damper (not shown) may be implemented between the engine 12 and the input member 18 of the transmission 14. The engine 12 transfers power to the transmission 14, which distributes torque through a transmission output member or shaft 20 to drive the final drive system 16, and thereby propel the vehicle (not shown).

In the embodiment depicted in FIG. 1, the engine 12 may be any of numerous forms of petroleum-fueled prime movers, such as the reciprocating-piston type internal combustion engines, which includes spark-ignited gasoline engines and compression-ignited diesel engines. The engine 12 is readily adaptable to provide its available power to the transmission 14 at a range of operating speeds, for example, from idle, at or near 600 revolutions per minute (RPM), to over 6,000 RPM. Irrespective of the means by which the engine 12 is connected to the transmission 14, the input member 18 is connected to a differential gear set encased within the transmission 14, as explained in more detail herein.

Referring still to FIG. 1, the hybrid transmission 14 utilizes one or more differential gear arrangements, preferably in the nature of three interconnected epicyclic planetary gear sets, designated generally at 24, 26 and 28, respectively. Each gear set includes three gear members: a first, second and third member. In referring to the first, second and third gear sets in this description and in the claims, these sets may be counted "first" to "third" in any order in the drawings (e.g., left to right, right to left, etc.). Likewise, in referring to the first, second and third members of each gear set in this description and in the claims, these members may be counted or identified as "first" to "third" in any order in the drawings (e.g., top to bottom, bottom to top, etc.) for each gear set.

The first planetary gear set 24 has three gear members: a first, second and third member 30, 32 and 34; respectively. In a preferred embodiment, the first member 30 includes of an outer gear member (which may be referred to as a "ring gear") that circumscribes the third member 34, which may include of an inner gear member (which may be referred to as a "sun gear"). In this instance, the second member 32 acts as a planet carrier member. That is, a plurality of planetary gear members (which may be referred to as "pinion gears") are rotatably mounted on the second member, planet carrier 32. Each planetary gear member is meshingly engaged with both the first member, ring gear 30 and the third member, sun gear 34.

The second planetary gear set 26 also has three gear members: a first, second and third member 40, 42 and 44, respectively. In the preferred embodiment discussed above with respect to the first planetary gear set 24, the first member 40 of the second planetary gear set 26 is an outer "ring" gear member that circumscribes the third member 44, which is an inner "sun" gear member. The ring gear member 40 is coaxially aligned and rotatable with respect to the sun gear member 44. A plurality of planetary gear members are rotatably mounted on the second member 42, which acts as a planet carrier member, such that each planetary gear meshingly engages both the ring gear member 40 and the sun gear member 44.

The third planetary gear set 28, similar to the first and second gear sets 24, 26, also has first, second and third members 50, 52 and 54, respectively. In this arrangement, the first member 50 is preferably the outer "ring" gear, which circumscribes the third member 54 or inner "sun" gear. The second member 52 is the planet carrier in this particular gear set, and is coaxially aligned and rotatable with respect to the sun gear member 54. As such, a plurality of planetary or pinion gear members are rotatably mounted on the carrier member 52. Each of the pinion gear members is aligned to meshingly engage either the ring gear member 50 and an adjacent pinion gear member or the sun gear member 54 and an adjacent pinion gear member.

In one embodiment on the transmission 14, the first and second planetary gear sets 24, 26 each include simple planetary gear sets, whereas the third planetary gear set includes a compound planetary gear set. However, each of the carrier members described above can be either a single-pinion (simple) carrier assembly or a double-pinion (compound) carrier assembly. Embodiments with long pinions are also possible.

The first, second and third planetary gear sets 24, 26, 28 are compounded in that the second member 32 of the first planetary gear set 24 is conjoined with (i.e., continuously connected to) the second member 42 of the second planetary gear set 26 and the third member 54 of the third planetary gear set 28, as by a central shaft 36. As such, these three gear members 32, 42, 54 are rigidly attached for common rotation.

The engine 12 is continuously connected to the first member 30 of first planetary gear set 24 through an integral hub plate 38, for example, for common rotation therewith. The third member 34 of the first planetary gear set 24 is continuously connected, for example, by a first sleeve shaft 46, to a first motor/generator assembly 56, interchangeably referred to herein as "motor A". The third member 44 of the second planetary gear set 26 is continuously connected by a second sleeve shaft 48, to a second motor/generator assembly 58, also interchangeably referred to herein as "motor B". The first member 50 of the third planetary gear set 28 is continuously connected to transmission output member 20 through an integral hub plate, for example. The first and second sleeve shafts 46, 48 may circumscribe the central shaft 36.

A first torque transfer device 70—which is herein interchangeably referred to as clutch "C1"—selectively connects the second gear member 52 with a stationary member, represented in FIG. 1 by transmission housing 60. The second sleeve shaft 48, and thus gear member 44 and motor/generator 58, is selectively connectable to the second member 52 of the third planetary gear set 28 through the selective engagement of a second torque transfer device 72—which is herein interchangeably referred to as clutch "C2". A third torque transfer device 74—which is herein interchangeably referred to as clutch "C3"—selectively connects the first gear member 40 of the second planetary gear set 26 to the transmission housing 60. The first sleeve shaft 46, and thus third gear member 34 and first motor/generator 56, is also selectively connectable to the first member 40 of the second planetary gear set 26, through the selective engagement of a fourth torque transfer device 76—which is herein interchangeably referred to as clutch "C4".

A fifth torque transfer device 78—which is herein interchangeably referred to as clutch "C5"—selectively connects the input member 18 of engine 12 and the first gear member 30 of the first planetary gear set 24 to the transmission housing 60. Clutch C5 is an input brake clutch, which selectively locks the input member 18 when engine 12 is off. Locking input member 18 provides more reaction for regenerative braking energy. As shown below, in reference to FIG. 2, C5 is not involved in the mode/gear/neutral shifting maneuvers of transmission 14.

Figures 2, 3:
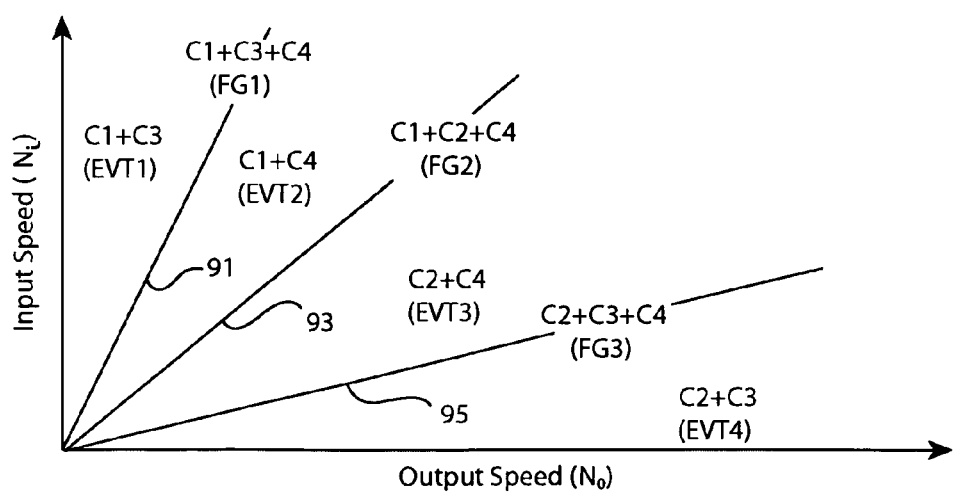
FIG. 2 is a truth table listing the engaged torque-transmitting mechanisms for each of the operating modes of the transmission illustrated in FIG. 1.
FIG. 3 is a graphical representation of various regions of operation with respect to input and output speeds of the transmission illustrated in FIG. 1.

The first and second torque transfer devices 70, 72 (C1 and C2) may be referred to as "output clutches." Disengagement of both output clutches places the transmission 14 in a neutral mode (see FIG. 2). The third and fourth torque transfer devices 74, 76 (C3 and C4) may be referred to as "holding clutches". One of the holding clutches must be engaged to hold the various members of the planetary gearset 24, 26, 28 and allow transmission 14 to balance input power (from engine 12, motor A, and motor B) against output power (final drive 16). A holding clutch is selectively operable to inhibit operation of one input of the compound planetary system.

In the exemplary embodiment depicted in FIG. 1, the various torque transfer devices 70, 72, 74, 76, 78 (C1-C5) are all friction clutches. However, other conventional clutch configurations may be employed, such as dog clutches, rocker clutches, and others recognizable to those having ordinary skill in the art. The clutches C1-C5 may be hydraulically actuated, receiving pressurized hydraulic fluid from a pump (not shown). Hydraulic actuation of clutches C1-C5 is accomplished, for example, by using a conventional hydraulic fluid control circuit, as will be recognized by one having ordinary skill in the art.

In the exemplary embodiment described herein, wherein the hybrid powertrain 10 is used as a land vehicle, the transmission output shaft 20 is operatively connected to the final drive system (or "driveline"). The driveline may include a front or rear differential, or other torque transfer device, which provides torque output to one or more wheels through respective vehicular axles or half-shafts (not shown). The wheels may be either front or rear wheels of the vehicle on which they are employed, or they may be a drive gear of a track vehicle. Those having ordinary skill in the art will recognize that the final drive system may include any known configuration, including front wheel drive (FWD), rear wheel drive (RWD), four-wheel drive (4WD), or all-wheel drive (AWD), without altering the scope of the claimed invention.

All of the planetary gear sets 24, 26, 28, as well as the first and second motor/generators 56, 58 (motor A and motor B,) are preferably coaxially oriented about the intermediate central shaft 36 or another axis. Motor A or motor B may take on an annular configuration, permitting one or both to generally circumscribe the three planetary gear sets 24, 26, 28. Such a configuration may reduce the overall envelope, i.e., the diametrical and longitudinal dimensions, of the hybrid transmission 14 are minimized.

The hybrid transmission 14 receives input motive torque from a plurality of torque-generative devices. "Torque-generative devices" include the engine 12 and the motors/generators 56, 58 as a result of energy conversion from fuel stored in a fuel tank or electrical potential stored in an electrical energy storage device (neither of which is shown).

The engine 12, motor A (56), and motor B (58) may operate individually or in concert—in conjunction with the planetary gear sets and selectively-engageable torque-transmitting mechanisms—to rotate the transmission output shaft 20. Moreover, motor A and motor B are preferably configured to selectively operate as both a motor and a generator. For example, motor A and motor B are capable of converting electrical energy to mechanical energy (e.g., during vehicle propulsion), and further capable of converting mechanical energy to electrical energy (e.g., during regenerative braking or during periods of excess power supply from engine 12).

With continuing reference to FIG. 1, an electronic control apparatus (or "controller") having a distributed controller architecture is shown schematically in an exemplary embodiment as a microprocessor-based electronic control unit (ECU) 80. The ECU 80 includes a storage medium with a suitable amount of programmable memory, collectively represented at 82, that is programmed to include, without limitation, algorithms or methods of regulating operation of the multi-mode hybrid transmission.

The control apparatus is operable, as described hereinafter, to provide coordinated system control of the powertrain 10 schematically depicted and described herein. The constituent elements of the control apparatus may be a subset of an overall vehicle control system. The control system is operable to synthesize pertinent information and inputs, and execute control methods and algorithms to control various actuators to achieve control targets. The control system monitors target and parameters including, without limitation: fuel economy, emissions, performance, driveability, and protection of drivetrain hardware—such as, but not limited to, the engine 12, transmission 14, motor A, motor B, and final drive 16.

The distributed controller architecture (ECU 80) may include a Transmission Control Module (TCM), an Engine Control Module (ECM), a Transmission Power Inverter Module (TPIM), and a Battery Pack Control Module (BPCM). A hybrid control module (HCP) may be integrated to offer overall control and coordination of the aforementioned controllers.

A User Interface (UT) is operatively connected to a plurality of devices (not shown) through which a vehicle operator typically controls or directs operation of the powertrain. Exemplary vehicle operator inputs to the user interface include an accelerator pedal, a brake pedal, transmission gear selector, vehicle speed cruise control, and other inputs recognizable to those having ordinary skill in the art.

Each of the aforementioned controllers communicates with other controllers, sensors, actuators, etc., via a control area network (CAN) bus or communication architecture. The CAN bus allows for structured communication of control parameters and commands between the various controllers. The communication protocol utilized is application-specific. For example, and without limitation, one useable communication protocol is the Society of Automotive Engineers standard J1939. The CAN bus and appropriate protocols provide for robust messaging and multi-controller interfacing between the aforementioned controllers, and other controllers providing functionality such as antilock brakes, traction control, and vehicle stability.

The engine control module is operatively connected to, and in communication with, the engine 12. The engine control module is configured to acquire data from a variety of sensors and control a variety of actuators of the engine 12 over a plurality of discrete lines. The engine control module receives an engine torque command from the hybrid control module, generates a desired axle torque, and an indication of actual engine torque, which is communicated to the hybrid control module. Various other parameters that may be sensed by the engine control module include engine coolant temperature, engine input speed to the transmission, manifold pressure, and ambient air temperature and pressure. Various actuators that may be controlled by the engine control module include, without limitation, fuel injectors, ignition modules, and throttle control modules.

The transmission control module is operatively connected to the transmission 14, and functions to acquire data from a variety of sensors and provide command signals to the transmission 14. Inputs from the transmission control module to the hybrid control module may include estimated clutch torques for each of the clutches C1-C5, and rotational speed of the transmission output shaft 20. Additional actuators and sensors may be used to provide additional information from the transmission control module to the hybrid control module for control purposes.

Each of the aforementioned controllers may be a general-purpose digital computer, generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, including resident program instructions and calibrations stored in ROM and executed to provide the respective functions of each computer. Information transfer between the various computers may be accomplished using the aforementioned CAN.

In response to operator input, as captured by the user interface, the supervisory hybrid control module controller and one or more of the other controllers described above with respect to FIG. 1 determine required transmission output torque. Selectively operated components of the hybrid transmission 14 are appropriately controlled and manipulated to respond to the operator demand. For example, in the embodiment shown in FIG. 1, when the operator has selected a forward drive range and manipulates either the accelerator pedal or the brake pedal, the hybrid control module determines an output torque for the transmission, which affects how and when the vehicle accelerates or decelerates. Final vehicle acceleration is affected by other variables, including such factors as road load, road grade, and vehicle mass. The hybrid control module monitors the parametric states of the torque-generative devices, and determines the output of the transmission required to arrive at the desired torque output. Under the direction of the hybrid control module, the transmission 14 operates over a range of output speeds from slow to fast in order to meet the operator demand.

The ECU 80 also receives frequency signals from sensors for processing into input member 18 speed, $N_i$, and output member 20 speed, $N_o$, for use in the control of transmission 14. The system controller may also receive and process pressure signals from pressure switches (not shown) for monitoring clutch application chamber pressures. Alternatively, pressure transducers for wide range pressure monitoring may be employed. Pulse-width modulation (PWM) and/or binary control signals are transmitted by the controller 80 to transmission 14 for controlling fill and drain of clutches C1-C5 for application and release thereof.

Additionally, the controller 80 may receive transmission fluid sump temperature data, such as from thermistor inputs (not shown), to derive a sump temperature. Controller 80 may provide PWM signals derived from input speed, $N_i$, and sump temperature for control of line pressure via one or more regulators.

Fill and drain of clutches C1-C5 may be effectuated, for example, by solenoid controlled spool valves responsive to PWM and binary control signals. Trim valves may be employed using variable bleed solenoids to provide precise placement of the spool within the valve body and correspondingly precise control of clutch pressure during apply. Similarly, one or more line pressure regulators (not shown) may be utilized for establishing regulated line pressure in accordance with the control signal. Clutch slip speeds across clutches may be derived from, for example: transmission input speed, output speed, motor A speed, and/or motor B speed.

The multi-mode, electrically-variable, hybrid transmission 14 is configured for several transmission operating modes. The truth table provided in FIG. 2 presents an exemplary engagement schedule of the torque-transmitting mechanisms C1-C4 to achieve the array of operating states or modes. The various transmission operating modes described in the table indicate which of the specific clutches C1-C4 are engaged (actuated), and which are released (deactivated) for each of the operating modes.

In general, ratio changes in transmission 14 may be performed such that torque disturbances are minimized, and the shifts are smooth and unobjectionable to the vehicle occupants. Additionally, release and application of clutches C1-C4 should be performed in a manner which consumes the least amount of energy, and does not negatively impact durability of the clutches. One major factor affecting these considerations is the torque at the clutch being controlled, which may vary significantly in accordance with such performance demands as acceleration and vehicle loading. Improved shifts may be accomplished by a zero, or close to zero, reactive torque condition at the clutches at the time of application or release, which condition follows substantially zero slip across the clutch. Clutches having zero slip across the clutch may be referred to as operating synchronously.

Electrically-variable operating modes may be separated into four general classes: input-split modes, output-split modes, compound-split modes, and series modes. In an input-split mode, one motor/generator (such as either motor A or motor B) is geared such that its speed varies in direct proportion to the transmission output, and another motor/generator (such as the other of motor A or motor B) is geared such that its speed is a linear combination of the input and output member speeds. In an output-split mode, one motor/generator is geared such that its speed varies in direct proportion to the transmission input member, and the other motor/generator is geared such that its speed is a linear combination of the input member and the output member speeds. A compound-split mode, however, has both motor/generators geared such that their speeds are linear combinations of the input and output member speeds, but neither is in direct proportion to either the speed of the input member or the speed of the output member.

Finally, when operating in a series mode, one motor/generator is geared such that its speed varies in direct proportion to the speed of the transmission input member, and another motor/generator is geared such that its speed varies in direct proportion to the speed of the transmission output member. When operating in series mode, there is no direct mechanical power transmission path between the input and output members and therefore all power must be transmitted electrically.

In each of the four general types of electrically-variable operating modes indicated above, the speeds of the motors are linear combinations of the input and output speeds. Thus, these modes have two speed degrees of freedom (which may be abbreviated for simplicity as "DOF"). Mathematically, the torque (T) and speed (N) equations of this class of modes take the form:

$$\begin{bmatrix} T_a \\ T_b \end{bmatrix} = \begin{bmatrix} a_{1,1} & a_{1,2} \\ a_{2,1} & a_{2,2} \end{bmatrix} \begin{bmatrix} T_i \\ T_o \end{bmatrix} \text{ and } \begin{bmatrix} N_a \\ N_b \end{bmatrix} = \begin{bmatrix} b_{1,1} & b_{1,2} \\ b_{2,1} & b_{2,2} \end{bmatrix} \begin{bmatrix} N_i \\ N_o \end{bmatrix}$$

where a and b are coefficients determined by the transmission gearing. The type of EVT mode can be determined from the structure of the matrix of b coefficients. That is, if $b_{2,1}=b_{1,2}=0$ or $b_{1,1}=b_{2,2}=0$, the mode is a series mode. If $b_{1,1}=0$ or $b_{1,2}=0$, the mode is an input split mode. If $b_{2,1}=0$ or $b_{2,2}=0$, the mode is an output split mode. If each of $b_{1,1}$, $b_{1,2}$, $b_{2,1}$, and $b_{2,2}$ are nonzero, for example, the mode is a compound split mode.

An electrically-variable transmission may also contain one or more fixed-gear (FG) modes. In general, FG modes result from closing (i.e., actuating) one additional clutch than the number required to select an electrically-variable mode. In FG modes, the speed of the input and each motor are proportional to the speed of the output. Thus, these modes have only one speed degree of freedom. Mathematically, the torque and speed equations of this class of modes take the form:

$$[T_b] = \begin{bmatrix} a_{1,1} & a_{1,2} & a_{1,3} \end{bmatrix} \begin{bmatrix} T_a \\ T_i \\ T_o \end{bmatrix} \text{ and } \begin{bmatrix} N_a \\ N_b \\ N_i \end{bmatrix} = \begin{bmatrix} b_{1,1} & b_{1,2} & b_{1,3} \end{bmatrix} [N_o]$$

where a and b are again coefficients determined by the transmission gearing. If $b_{1,1}$ is nonzero, motor A can contribute to output torque during operation in the fixed-gear mode. If $b_{1,2}$ is nonzero, motor B can contribute to output torque during operation in the fixed-gear mode. If $b_{1,3}$ is nonzero, the engine can contribute to output torque during operation in the fixed-gear mode. If $b_{1,3}$ is zero, the mode is an electric-only fixed-gear mode.

An electrically-variable transmission may also be configured for one or more modes with three speed degrees of freedom. These modes may or may not include reaction torque sources such that the transmission is capable of producing output torque proportional to engine torque or motor torque. If a mode with three speed degrees of freedom is capable of producing output torque, the torques of the engine and any motor connected as a reaction to the engine torque will generally be proportional to the output torque. If a motor is not connected as a reaction to the engine torque, its torque can be commanded to control its speed independently of the transmission input and output speed.

In a mode with three speed degrees of freedom, it is generally not possible to easily control battery power independently of output torque. This type of mode produces an output torque which is proportional to each of the reacting torque sources in the system. The fraction of total output power provided by each of the three torque sources may be adjusted by varying the speeds of the motors and input. These modes are hereafter referred to as electric torque converter (ETC) modes in recognition of the fact that power flows to or from the energy storage device as a function of the output torque and the speed of the engine, output, and one of the motors. Mathematically, the torque and speed equations of this class of modes take the form:

$$\begin{bmatrix} T_a \\ T_b \\ T_i \end{bmatrix} = \begin{bmatrix} a_{1,1} & a_{1,2} & a_{1,3} \end{bmatrix} [T_o] \text{ and } [N_b] = \begin{bmatrix} b_{1,1} & b_{1,2} & b_{1,3} \end{bmatrix} \begin{bmatrix} N_a \\ N_i \\ N_o \end{bmatrix}$$

where a and b are coefficients determined by the transmission gearing. If $a_{1,1}$ is nonzero, motor A serves as a reaction member and its torque is proportional to output torque when operating in the ETC mode. If $a_{1,1}$ is zero, motor A is disconnected and its torque is not determined by the output torque. If $a_{1,2}$ is nonzero, motor B serves as a reaction member and its torque is proportional to output torque when operating in the ETC mode. If $a_{1,2}$ is zero, motor B is disconnected and its torque is not determined by the output torque. If $a_{1,3}$ is nonzero, the engine can contribute to output torque during operation in the fixed-gear mode. If $a_{1,3}$ is zero, the input is disconnected and its torque is not determined by the output torque. If all of $a_{1,1}$, $a_{1,2}$, and $a_{1,3}$ are zero, the mode is a neutral mode that is not capable of producing output torque.

There are four neutral modes presented in FIG. 2. In Neutral 1, all clutches are released. Neutral 1 may be utilized when the entire vehicle is stopped and in an off-state, and thus there is no power distribution, electrical, mechanical, or otherwise, being actively distributed throughout the powertrain 10. In Neutral 1, a 12-volt starting-lighting-and-ignition (SLI) battery may be used for engine start.

In Neutral 2, only clutch C3 is engaged, and motor A and motor B may react engine 12 for start or to charge the energy storage device. Similar to Neutral 2, when transmission 14 is in Neutral 3, motor A and motor B may react engine 12 for start or to charge the energy storage device, and clutch C4 as the only engaged torque-transmitting device. In Neutral 4, the third and fourth clutches C3, C4 are both in an activated state. In this instance, motor A is locked or "grounded", and motor B is geared with the engine 12 for engine start.

The first and second planetary gear sets 24, 26 cooperate with the first and second motor/generators 56, 58, along with the selective engagement of the first and second clutches C1, C2, to constitute an electric torque converter (ETC). For example, when the transmission 14 is operating in an ETC mode, the electric output of motor A and/or motor B, depending upon the active control schedule, can be adapted to control the transfer of torque from the engine 12 through the transmission differential gearing to the output member 20. When the vehicle is started, ETC1 Mode is established by engaging the first clutch C1. In ETC1 Mode, motor A reacts engine 12 with the first and third planetary gear sets 24, 28, and motor B freewheels. In ETC1 Mode, the stationary vehicle can be smoothly started with the engine 12 held at a suitable speed by gradually increasing the amount of electric power generated by motor A—i.e., the reaction force of motor A.

There are two other alternative ETC modes available utilizing the transmission configuration presented herein. ETC2 Mode, also known as "compound ETC", can be initiated by engaging clutch C2, and disengaging the remaining clutches. In ETC2 Mode, motor A reacts engine 12 with the first and third planetary gear sets 24, 28, while motor B reacts engine 12 and motor A to the output member 20. The distribution of engine torque is manipulated through the cooperative management of the amount of electric power output generated by motor A and motor B.

The third ETC mode, ETC12 Mode, can be initiated by engaging both clutch C1 and clutch C2. Similar to ETC1 Mode, motor A reacts the engine 12 with the first and third planetary gear sets 24, 28. However, in this instance, motor B is grounded to the transmission housing 60. In ETC12 Mode, the vehicle can be smoothly accelerated with the engine 12 held at a suitable speed by gradually increasing the reaction force generated by motor A; which may be proportional to the electric power generated by motor A.

When the engine 12 is in an off-state, the transmission 14 can utilize the ETC mode clutch control schedule to vary the amount of electric energy generated by motor A so as to gradually increase the drive torque of motor A and/or motor B. For example, if the transmission 14 is shifted into ETC1 Mode when the engine 12 is in an off-state, the engine 12 will create a reaction force, by way of input member 18. The motive output of the motor A can then be controlled, and a continuous and uninterrupted transmission output torque maintained, without having to turn the engine 12 on.

The exemplary powertrain 10 described herein has three fixed-gear (FG), or "direct," modes of operation. In all fixed-gear modes of this embodiment of transmission 14, the vehicle is driven in the forward direction by operation of the engine 12. The selective engagement of clutches C1, C3 and C4 shifts the transmission 14 into FG1 Mode. In FG1, motor A is grounded, and the engine drives the first planetary gear set 24 to the third planetary gear set 28 and, thus, the output member 20. FG2 Mode is achieved by the selective engagement of clutches C1, C2 and C4. In FG2, motor B is grounded, and the engine drives the first and second planetary gear sets 24, 26 to the third planetary gear set 28 and, thus, the output member 20. Likewise, FG3 Mode is achieved by the selective engagement of clutches C2, C3 and C4. In FG3, motor A is locked, and the engine drives the first planetary gear set 24 to the second and third planetary gear sets 26, 28 and the output member 20. When operating in a fixed-gear mode of operation, the output member speed $N_o$ is directly proportional to input member speed $N_i$ and the selected gear ratio. $N_i = N_o \times GR$.

With continued reference to FIG. 2, the transmission 14 may also operate in four electrically-variable transmission (EVT) modes. In EVT1 and EVT4, the transmission 14 is operating in an input-split mode of operation, wherein the output speed $N_o$ of the transmission 14 is proportional to the speed of one motor/generator 56, 58 (motor A or motor B). Specifically, EVT1 Mode is achieved through the selective engagement of the first and third clutches C1 and C3. When in EVT1, motor A functions to react the engine 12 with the first planetary gear set 24, to the third planetary gear set 28, and the output member 20; while motor B drives the second and third planetary gear sets 26, 28. Motor A propels the vehicle in EVT1. Alternatively, the transmission 14 may be selectively shifted into EVT4 Mode by actuating clutch C2 and clutch C3. In EVT4, motor A functions to react the engine 12 with the first planetary gear set 24, to the second and third planetary gear sets 26, 28, and the output member 20, while motor B drives the second and third planetary gear sets 26, 28. Motor B propels the vehicle in EVT4.

In EVT2 and EVT3, the transmission 14 is operating in a compound-split mode, wherein the output speed $N_o$ of the transmission 14 is not proportional to the speed of a single motor/generator, but is rather an algebraic linear combination of the speeds of both motor/generators. More particularly, EVT2 is achieved through the selective engagement of the first and fourth clutches C1, C4. In this mode, motor A and motor B operate to react the engine 12 with the first and second planetary gears sets. Alternatively, the transmission 14 may be selectively shifted into EVT3 Mode by actuating clutch C2 and clutch C4. When operating in EVT3 Mode, the two motor/generator assemblies 56, 58 react the engine 12 with all three planetary gear sets 24, 26, 28.

With reference to FIG. 3, a plot of transmission output speed, $N_o$, along the horizontal axis versus input speed, $N_i$, across the vertical axis is illustrated. FIG. 3 is only a graphical representation of exemplary regions of operation for each operating mode with respect to input and output speeds of this embodiment of transmission 14.

Synchronous operation in FG1—the input speed and output speed relationships where clutches C1, C3 and C4 are operating with substantially zero slip speed thereacross—is represented by line 91. As such, line 91 represents an input and output speed relationship at which substantially synchronous shifting between EVT modes can occur. FG1 is also a range at which direct mechanical coupling from input to output can be effected by simultaneous application of clutches C1, C3 and C4—i.e., fixed- or direct-ratio.

Synchronous operation in FG2—the input speed and output speed relationships where clutches C1, C2 and C4 are operating with substantially zero slip speed thereacross—is represented by line 93. Similarly, the relationships between input and output speed during operation in FG3, whereat clutches C2, C3 and C4 are operating simultaneously with substantially zero slip speed thereacross, is represented by line 95.

To the left of the shift ratio line 91 is an exemplary region of operation for the first EVT mode, EVT1, wherein both C1 and C3 are applied, and C2 and C4 are released. To the right of the shift ratio line 91 and left of shift ratio line 93 is an exemplary region of operation for the second EVT mode, EVT2, wherein C1 and C4 are applied, and C2 and C3 are released.

To the right of shift line 93 and left of shift ratio line 95 is an exemplary region of operation for the third EVT mode, EVT3, wherein both C2 and C4 are applied, and C1 and C3 are released. To the right of the shift ratio line 95 is an exemplary region of operation for the fourth EVT mode, EVT4, wherein C2 and C3 are applied, and C1 and C4 are released. As used herein with respect to clutches C1-C5, the terms "applied" or "actuated" indicate substantial torque transfer capacity across the respective clutch. The terms "released" or "deactivated" indicate insubstantial or no torque transfer capacity across the respective clutch.

While the regions of operation specified above may be generally favored for operation of the hybrid transmission 14, it is not meant to imply that the various EVT regions of operation depicted in FIG. 3 cannot or do not overlap. Generally, however, it may be preferred to operate in the specified regions because each particular mode of operation preferably employs gear sets and motor hardware particularly well suited in various aspects (e.g., mass, size, cost, inertial capabilities, etc.) for that region. Similarly, while the individual regions of operation specified above are generally preferred for the particular modes of operation indicated, it does not imply that the regions of operation for the individual EVT modes cannot be switched.

Generally, a shift into Mode 1 may be considered a downshift and is associated with a higher gear ratio in accordance with the relationship of $N_i/N_o$. In contrast, a shift into Mode 4 is considered an upshift, and is associated with a lower gear ratio in accordance with the relationship of $N_i/N_o$. As discussed herein, other mode-to-mode shift sequences are feasible. For example, a shift from EVT1 to EVT3 is also an upshift, while a shift from EVT4 to EVT2 is considered a downshift.

During operation of powertrain 10, an initiated shift sequence may be detected by the ECU 80. If a shift sequence is not initiated—for example, by operator command or change in vehicle operating conditions—the ECU 80 monitors the transmission 14 and will continue in its current state of operation.

If a shift sequence is initiated—for example, via operator tip-in—the ECU 80 will determine whether the shift maneuver should be an EVT-to-EVT transition. That is, based upon the current vehicle operating conditions, vehicle speed, magnitude of desired torque change, etc., the ECU 80 will determine if the optimal shift maneuver is from one EVT operating mode to another EVT operating mode.

The EVT-to-EVT shift sequence or event may occur in multiple ways. For example, the exemplary powertrain 10 shown in FIG. 1 is configured to perform an EVT-to-EVT shift by transitioning through a fixed-gear mode, or, as described in more detail below, through an ETC mode. However, because FG modes create a direct drive between engine 12 and final drive 16, transitioning through an FG mode is available only if engine 12 is running.

If an EVT-to-EVT shift is requested, the hybrid control module will determine if engine 12 is in an engine-on or engine-off state. If engine 12 is on, the hybrid control module will determine which shift sequence provides for more-optimal shifting under the current operating conditions. If an EVT-to-EVT shift sequence is initiated under engine-on vehicle operation, the transmission control module may respond by pre-filling the oncoming clutch associated with the target EVT mode to a predetermined pre-fill level.

For example, if the transmission 14 is to make an upshift from EVT1 mode to EVT2 mode, the offgoing clutch associated with initial, active mode (EVT1) is C3, and the oncoming clutch associated with the target, desired mode (EVT2) is C4. The clutch volume for the oncoming clutch mechanism, C4, can be filled to 80-90% without reaching torque capacity or causing an inordinate amount of slip, which may otherwise interfere with the current operating mode. This pre-fill strategy may shorten the overall shift time of an EVT-to-EVT maneuver by reducing sequential fill times.

If the transmission control module determines that a transition through ETC mode is preferred, the transmission control module deactivates offgoing clutch C3. Referring again to FIGS. 2 and 3, once C3 is no longer transferring torque, only clutch C1 remains engaged and the transmission 14 is placed in ETC1 mode. By placing transmission 14 in ETC1 mode, engine 12 is not required to follow the fixed speed path associated with FG1 (shown on line 91) and input speed $N_i$ may vary independently from output speed $N_o$.

To complete the shift event and place transmission in EVT2, the oncoming clutch C4 is then actuated. Clutch C4—which may or may not have been pre-filled—is synchronized to substantially zero clutch slip speed and then filled to the holding pressure required to transfer torque across clutch C4. This EVT1-to-EVT2 upshift is therefore characterized by lack of transition through FG1 mode and the speed of engine 12 does not dwell on the gear ratio of FG1. The vehicle operator and occupants may experience an improved shift maneuver as compared to shifting through one of the fixed-gear modes.

Note that synchronous disengagement of clutch C3 followed by synchronous engagement of clutch C4 occurs while the speed of motor A, $N_A$, is at or near zero. Near-zero $N_A$ allows transmission 14 to balance battery power against power output, even while increasing or decreasing input speed $N_i$. Furthermore, the transmission 14 continuously produces an output torque when transitioning from EVT1-to-EVT2 mode.

A similar EVT-to-EVT shift event using three clutches may occur where the transmission control module determines there is a need to shift from EVT3 mode to EVT4 mode while engine 12 is running. EVT3 mode is selected by engagement of clutches C4 and C2. EVT4 mode is selected via engagement of clutches C3 and C2.

If the transmission control module (or other portion of the control architecture of powertrain 10) determines that a transition through ETC mode is preferred over a transition through FG3, the transmission control module deactivates offgoing holding clutch C4. Referring again to FIGS. 2 and 3, once C4 is no longer transferring torque, only clutch C2 remains engaged and the transmission 14 is placed in ETC2 mode. By placing transmission 14 in ETC2 mode, engine 12 is not required to follow the fixed speed path associated with FG3 (shown on line 95) and input speed $N_i$ may vary independently from output speed $N_o$.

To complete the shift event and place transmission in EVT4, the oncoming holding clutch C3 is then actuated. Clutch C3—which may or may not have been pre-filled—is synchronized to substantially zero clutch slip speed and then filled to the holding pressure required to transfer torque across clutch C3. This EVT3-to-EVT4 upshift is therefore characterized by lack of transition through any fixed-gear or direct-drive mode and the speed of engine 12 does not dwell on the gear ratio of FG3.

While the best modes and other modes for carrying out the present invention have been described in detail, those familiar with the art to which this invention pertains will recognize various alternative designs and embodiments for practicing the invention within the scope of the appended claims.

The invention claimed is:

1. A method for controlling a shift sequence of a multi-mode hybrid transmission operatively connected to an engine, the method comprising:

deactivating an offgoing clutch, wherein engagement of the offgoing clutch and a common clutch is operable to select a first electrically-variable transmission (EVT) mode, such that the transmission is not in the first EVT mode;

wherein deactivation of said offgoing clutch while maintaining engagement of the common clutch transitions the transmission to an electric torque converter (ETC) mode that is different from said first EVT mode;

actuating an oncoming clutch, wherein engagement of the common clutch and the oncoming clutch is operable to select a second EVT mode that is different from said ETC mode and said first EVT mode, neither of which includes engagement of the oncoming clutch;

wherein transitioning from said first EVT mode to said second EVT mode is characterized by a lack of a transition through a fixed-gear (FG) mode, such that the transmission transitions directly from the first EVT mode to the ETC mode and then to the second EVT mode; and wherein the engine is in an on-state during deactivation of said offgoing clutch and maintains the on-state during actuation of said oncoming clutch.

2. The method of claim 1, further comprising varying a speed of the engine while said offgoing clutch is disengaged and prior actuating said oncoming clutch.

3. The method of claim 2, wherein the transmission continuously produces an output torque when transitioning from said first EVT mode to said second EVT mode.

4. The method of claim 3, further comprising synchronizing said oncoming clutch to substantially zero clutch slip speed, wherein said synchronizing occurs prior to actuating said oncoming clutch.

5. A method for executing a shift from an initial electrically-variable transmission (EVT) mode to a target EVT mode in a multi-mode, electrically-variable, hybrid transmission operable to receive power from an engine and at least one motor/generator assembly, the initial EVT mode cooperatively established by engagement of first and second clutches, and the target EVT mode cooperatively established by engagement of the first clutch and a third clutch, the method comprising:

filling the third clutch to a predetermined pre-fill level;

exhausting the second clutch to a predetermined fill level to thereby transition the transmission to an electric torque converter (ETC) mode while the third clutch is not engaged; and synchronizing and engaging the third clutch to thereby transition the transmission to the target EVT mode.

6. The method of claim 5, wherein the engine is in an on-state during the shift from the initial EVT mode to the target EVT mode.

7. The method of claim 6, wherein the shift from the initial EVT mode to the target EVT mode is characterized by a lack of a transition through a neutral mode or a fixed-gear (FG) mode.

8. The method of claim 7, further comprising varying a speed of the engine while said second clutch is disengaged and prior to synchronizing and engaging the third clutch.

9. The method of claim 8, wherein said second and third clutches are holding clutches.

* * * * *